Figure 1:
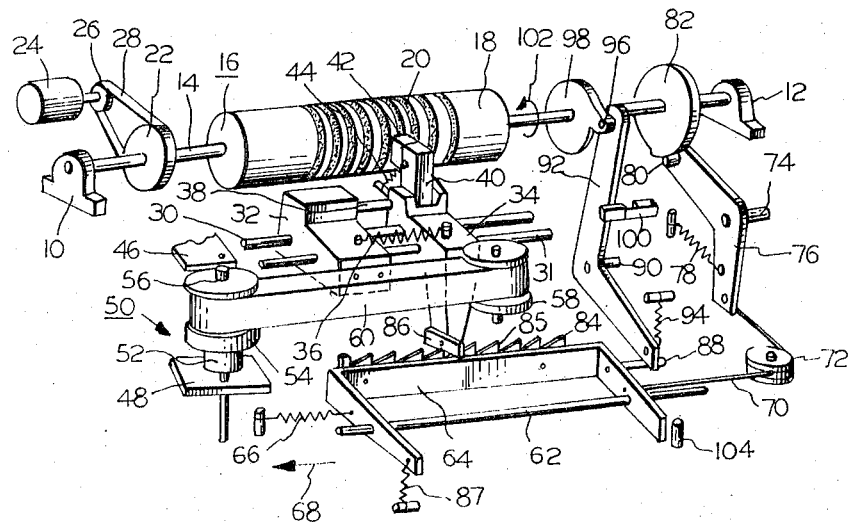

United States Patent [19]
Kozu

[11] 3,843,963
[45] Oct. 22, 1974

[54] ANNOUNCING DEVICE FOR USE WITH A MEASURING APPARATUS

[75] Inventor: Isao Kozu, Osaka, Japan

[73] Assignee: Matsushita Electric Industrial Co., Ltd., Osaka, Japan

[22] Filed: Sept. 6, 1972

[21] Appl. No.: 286,668

[30] Foreign Application Priority Data
Sept. 9, 1971  Japan.............................. 46-70198

[52] U.S. Cl......................... 360/12, 360/78, 360/86, 360/106
[51] Int. Cl..................... G11b 27/14, G11b 21/08, G11b 21/34
[58] Field of Search ............ 179/100.2 MD, 6 TA, 179/100.1 PS, 179/100.1 C; 360/12, 78, 86, 106

[56] References Cited
UNITED STATES PATENTS

| | | | |
|---|---|---|---|
| 2,248,081 | 7/1941 | Herman............................ | 179/6 TA |
| 3,075,775 | 1/1963 | Druz........................ | 179/100.2 MD |
| 3,161,729 | 12/1964 | McCarty et al. ......... | 179/100.2 MD |
| 3,440,358 | 4/1969 | Stenby..................... | 179/100.2 MD |
| 3,469,038 | 9/1969 | Green...................... | 179/100.2 MD |
| 3,535,465 | 10/1970 | Smith............................. | 179/6 TA |
| 3,637,952 | 1/1972 | Hataya et al.............. | 179/100.1 PS |

Primary Examiner—Alfred H. Eddleman
Attorney, Agent, or Firm—Wenderoth, Lind & Ponack

[57] ABSTRACT

An announcing device for use with a measuring apparatus which comprises a recording medium having a plurality of sound tracks corresponding to an amount determined by measuring, a transducer head, and driving means for providing relative movement between the recording medium and the transducer head in proportion to the amount determined by the measuring apparatus. Shifting means are provided for producing a slight relative movement between the recording medium and the transducer head so as to position said transducer head precisely at one of said sound tracks. Moving means provide relative successive movement between said recording medium and said transducer head so that said transducer head reproduces the voice signal corresponding to the amount determined by the measuring apparatus.

4 Claims, 2 Drawing Figures

PATENTED OCT 22 1974　　　　　　　　　　　　　　　　3,843,963

ANNOUNCING DEVICE FOR USE WITH A MEASURING APPARATUS

This invention relates to an announcing device for use with a measuring apparatus, and more particularly to a device for orally announcing the amount determined by a measuring operation such as a dimension, weight, or speed, etc. In a conventional measuring device, such as an automobile speedometer, the speed is indicated by means of a dial and pointer. The driver must, therefore, use his eyes to recognize the measured speed. However, there are times when he cannot watch the measuring apparatus for one reason or another. For example, an automobile driver must watch the car in front of him when he wants to pass. It is extremely dangerous to watch his speedometer while passing.

Various attempts have been made in the past to provide announcing devices for such measuring apparatus. In these devices, a magnetic recording medium having a plurality of sound tracks each storing a voice signal corresponding to a measured amount is moved in proportion to the amount determined by measuring. This recording is scanned by a transducer head so that the measured amount is orally announced. In these devices, the sound track is correctly scanned by the head only when the sound track exactly corresponds with the position of the head. It frequently occurs that the sound track gets out of the correct scanning position of the head because of successive displacements as a result of changes in the measured amounts. This causes a lowering of S/N ratio and an increase in the amount of crosstalk. In extreme conditions, such as when the head is positioned at a gap between sound tracks, the head reproduces no signals at all.

Accordingly, it is an object of the present invention to provide an improved announcing device for a measuring apparatus with novel means for correctly positioning a transducer head exactly at one of the sound tracks.

It is another object of the present invention to provide an improved announcing device for a measuring apparatus wherein a transducer head is moved in proportion to a measured amount, and is then further shifted slightly to correspond exactly with one of the sound tracks.

It is a further object of the present invention to provide an improved announcing device for a measuring apparatus which is simple in construction, inexpensive to manufacture and reliable in operation.

These objects are achieved by providing an announcing device for a measuring apparatus according to the present invention which comprises a recording medium having a plurality of sound tracks storing voice signals thereon. Each signal corresponds to an amount which the measuring apparatus is capable of measuring. The device further includes a transducer head for scanning said sound tracks and a means for causing relative movement between said recording medium and said transducer head in proportion to the amount determined by the measuring apparatus. Shifting means are also provided for making a slight relative movement between said recording medium and said transducer head so as to position said transducer head exactly at one of said sound tracks; and moving means cause relative successive movement at a predetermined speed between said recording medium and said transducer head so that said transducer head scans one of said sound tracks to reproduce the voice signals recorded on said track which correspond to the amount measured by the measuring means.

Figure 2:
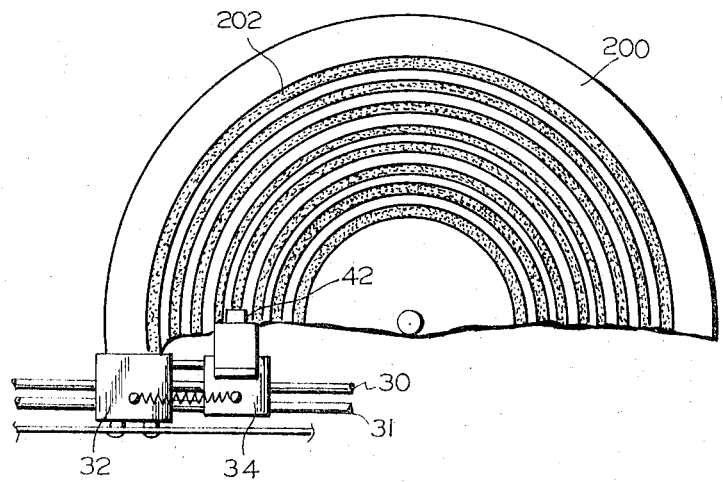

Further objects and advantages will become apparent from the following detailed description considered in connection with the accompanying drawings, in which:

FIG. 1 is a perspective view of an announcing device for a measuring apparatus according to the present invention; and FIG. 2 is a top plan view of a second embodiment of a recording medium used with the announcing device.

Referring now to the drawings there will be explained one embodiment of an announcing device for a measuring apparatus which is connected to a speedometer of an automobile.

With reference to FIG. 1, a cylindrical recording body 16 is secured to a main shaft 14 which is rotatably supported by bearings 10 and 12. A magnetic layer 18 is formed on the peripheral surface of said recording body 16. This magnetic layer can be obtained by coating magnetic powder directly on the recording body or by wrapping a flexible magnetic sheet around the recording body. A plurality of sound tracks 20 are formed circumferentially on said magnetic layer 18 of the recording body 16. Each sound track 20 has a voice signal recorded thereon which corresponds to an amount determined by various measuring apparatus. These sound tracks 20 are arranged to be equidistant from each other.

When the announcing device of this invention is used with the speedometer of an automobile, voice signals corresponding to the speed of the automobile are prerecorded onto the sound tracks, such as "10 kilometers," "20 kilo-meters," "30 kilo-meters," etc. In FIG. 1, the slower speeds are on the left and the faster speeds are on the right.

An endless belt 28 is arranged between a pulley 22 secured to the main shaft 14 and a pulley 26 secured to the shaft of a motor 24. Upon energization of the motor 24, the recording body 16 is rotated at a predetermined constant speed through said belt 28.

A carriage 32 and a head supporting member 34 are slidably mounted on a pair of guide bars 30 and 31 which are arranged parallel to the main shaft 14. Said carriage 32 and head supporting member 34 are biased towards each other by a tension spring 36 connected therebetween. This approaching movement is restricted by a stopper pin 38 secured to said carriage 32 which is pressed against a side wall of the head supporting member 34. A transducer head 42 is attached to the upper end of a head arm 40 which is pivotally mounted on said head supporting member 34. This head arm 40 is biased by a tension spring 44 to press said head 42 onto the peripheral surface of the recording body 16. Accordingly, head 42 is selectively brought into engagement with one of the sound tracks 20 on the recording body 16 are a result of the sliding movement of carriage 32 and head supporting member 34 along the guide bars 30 and 31.

A speedometer 50 is provided between base plates 46 and 48. This speedometer 50 includes a meter driving unit 52 which rotates in proportion to the rotational speed of the wheels of the automobile, a rotor 54 which produces a torque in proportion to said rotational speed and a control spring 56 which acts to become balanced with said torque. An endless belt 60 is disposed between said rotor 54 and a pulley 58 which is rotatably mounted on the base plate 48. One end of said carriage 32 is affixed to the endless belt 60.

When voice signals are pre-recorded on the recording body 16 which represent a series of speeds of every 10 kilo-meters per hour, the rotor 54 should be arranged to drive the endless belt 60 to move a distance equal to one pitch of the sound tracks 20 for every 10 kilo-meters per hour of the automobile speed. Accordingly, when the automobile is moving at a speed of 60 kilo-meters per hour, for example, belt 60 moves across six of the sound tracks 20. As a result of the movement of the belt 60, the carriage 32 and the head supporting member 34 also move the same distance. Therefore, the head 42 moves across six of the sound tracks 20 and is positioned opposite the sound track which has pre-recorded thereon a voice signal representing "60 kilo-meters." However, if the automobile moves at a speed between 50 kilo-meters per hour and 60 kilo-meters per hour, for example, the head 42 will not be exactly opposed to any of the sound tracks 20. However, even in such a case, the head 42 can be made to be exactly opposed to one of the sound tracks 20 by the shifting means of the present invention which will be explained in detail hereinafter.

An actuating member 64 is pivotally mounted on a shaft 62 which is parallel to the main shaft 14. The actuating member 64 is adapted to slide horizontally along shaft 62, and is biased to move in the direction of arrow 68 by a tension spring 66. In addition, a rope 70 attached to one end of the actuating member 64 is wrapped around a roller 72 and is then fastened to one end of a first actuating lever 76. The lever 76 is rotatable around a horizontal shaft 74 and is biased by a tension spring 78 which is stronger than tension spring 66, and which pulls the actuating member 64 in a direction opposite to that of the arrow 68. The rotation of said first actuating lever 76 is restricted by the engagement of a pin 80 secured to the other end of the first actuating lever 76, with the surface of a first cam 82, which is secured to the main shaft 14.

An actuating plate 84 having a plurality of saw teeth 85 formed thereon is attached to the actuating member 64 in parallel with the main shaft 14 and a knife edge 86 is attached to the lower portion of the head supporting member 34. Actuating member 64 is biased by tension spring 87 to swing said actuating plate 84 toward said knife edge 86. The rotation of actuating member 64 is restricted by a pin 88 secured to said actuating member 64 when said pin is forced against one end of a second actuating lever 92 which is rotatable around a horizontal shaft 90. This second actuating lever 92 is biased by a tension spring 94 to swing around the horizontal shaft 90 to press a pin 96 secured to the other end of the second actuating lever 92 against the surface of a second cam 98.

When the motor 24 is not rotating, the pin 96 is engaged with a protruding portion of the second cam 98, as shown in FIG. 1, and the second actuating lever 92 presses the pin 88 down to separate the actuating plate 84 from the knife edge 86. In this position, a switch 100 for providing electric power to the motor 24 is opened by the second actuating lever 92. Therefore, the motor 24 is not supplied with electric power through the switch 100. Since the pin 80 of the first actuating lever 76 is engaged with a protruding portion of the first cam 82, the actuating member 64 is positioned at its extreme left side in the direction of the arrow 68 by the tension spring 66.

As shown in FIG. 1, each of the saw teeth 85 has a sloping surface inclined downwards in the direction of the arrow 68 and a vertical surface having a predetermined pitch between the teeth. This pitch of the saw teeth 85 is the same as the pitch of the sound tracks 20 on the recording body 16. The knife edge 86 is adapted to be opposed to the edge of one of the saw teeth 85 when the head 42 is exactly opposed to one of the sound tracks 20.

Now, considering the case wherein the automobile moves at a speed of 55 kilo-meters, for example, the head 42 may be positioned halfway between the sound track representing "50 kilo-meters" and the sound track representing "60 kilo-meters". When an operation switch (not shown), connected in parallel with the switch 100, is turned on and the motor 24 is supplied with electric power, the recording body 16 begins to rotate in the direction of arrow 102. At the first stage of the rotation of the recording body 16, the protruding portion of the second cam 98 passes the position of the pin 96 so that the second actuating lever 92 is swung by the tension spring 96. The one end of lever 92 attached to spring 94 then moves upward away from the pin 88 of the actuating member 64. Accordingly, the actuating member 64 is swung by the tension spring 87 to bring the sloping surface of one of the saw teeth 85 into engagement with the knife edge 86. In addition, since the switch 100 is closed upon said swinging motion of the second actuating lever 92, supply of electric power to the motor 24 is maintained, even if the operation switch is brought to an inoperative position.

Upon further rotation of the main shaft 14 in the direction of arrow 102, the protruding portion of the first cam 82 passes through the position of the pin 80 so that the first actuating lever 76 is swung by the tension spring 78 to pull the rope 70 so as to slide the actuating member 64 in the opposite direction of the arrow 68 until the actuating member 64 is pressed against a stopper pin 104. The amount of this movement of the actuating member 64 is approximately equal to one pitch of the saw teeth 85 of the actuating plate 84, and therefore one pitch of the sound track 20. The knife edge 86, which has been engaged with the sloping surface of one of the saw teeth 85, will come in contact with the bottom of one of the saw teeth 85 during the middle of the movement of the actuating member 64. As a result, the knife edge 86 is shifted a distance equal to about half a pitch of the saw teeth 85 in the opposite direction to the arrow 68 by the remaining stroke of the actuating member 64. At the same time, the head supporting member 34 is moved against the biasing force of the tension spring 36 so that the head 42 is brought to a position exactly opposite the sound track having the voice signal representing "60 kilo-meters" recorded thereon. After that, the recording body 16 further rotates in the direction of arrow 102 so that the head 42 scans said sound track to reproduce the voice signal. The voice signal representing "60 kilo-meters" is thus announced by a speaker through a suitable amplifier.

When the main shaft 14 makes one full rotation, the protruding portion of the first cam 82 drives the pin 80 to swing the first actuating lever 76. As a result, the actuating member 64 is moved in the direction of arrow 68 by the spring 66 to its original position. In addition, the protruding portion of the second cam 98 drives the pin 96 to swing the second actuating lever 92. One end of said second actuating lever 92 depresses the pin 88 to swing the actuating member 64 around the shaft 62 to thus separate the actuating plate 84 from the knife edge 86. Accordingly, the head supporting member 34 is pulled back in the direction of arrow 68 by the spring 36 and is pressed against the stopper pin 38.

Further, the above swinging movement of the second actuating lever 92 opens the switch 100 so that the power to the motor 24 is shut off. Therefore, the main shaft 14 stops its rotation.

It will be apparent from the above description that the speed measured is announced at the next highest unit when the measured speed is between two pre-recorded units.

Thus, in the above example, when the automobile runs at a speed between 50–60 kilo-meters per hour the pre-recorded voice "60 kilo-meters" is announced. When the automobile runs at a speed equal to a speed pre-recorded on the sound tracks, such as 50 or 60 kilo-meters per hour, the top portion of one of the saw teeth 85 engages the knife edge 86. Therefore, the knife edge 86 will not move when the actuating member 64 moves a distance equal to one pitch of the saw teeth 85 in the opposite direction of the arrow 68. As a result, the head scans the sound track storing the voice signal corresponding to the exact speed of the automobile. In this case, the speed announced from the speaker corresponds exactly to the speed of the automobile.

In the above embodiment, the voice signals corresponding to the speed are recorded on the sound tracks in 10 kilo-meters per hour intervals. In order to reduce the error between the speed announced from the speaker and the actual speed of the automobile, the distance between the sound tracks could be reduced and the number of tracks increased so that every 1 kilo-meter per hour could be pre-recorded.

Another embodiment according to the present invention will now be explained hereinafter with reference to FIG. 2. In this embodiment, a magnetic disc 200 is employed instead of the cylindrical recorded body. A plurality of concentric circular sound tracks 202 are formed on said magnetic disc 200, each having a voice signal recorded thereon which corresponds to an amount which can be determined by the measuring apparatus. The carriage 32 and the head supporting member 34, which have been described in the above embodiment in FIG. 1, are arranged to move across an upper surface of the magnetic disc 200 in proportion to an amount determined by the measuring apparatus. Therefore, the head 42 can selectively scan one of the sound tracks 202 to reproduce the voice signal recorded thereon so that various amounts determined by the measuring apparatus can be announced vocally. Alternatively, the magnetic disc 200 can be replaced by a phonograph disc having a plurality of concentric sound grooves mechanically cut thereon, and head 42 can be replaced by a phonograph pickup head. It should be apparent that various types of recording media, regardless of their shape, can be employed in this invention, if a plurality of sound tracks can be formed on said media.

In the embodiment of FIG. 1, the speedometer of an automobile has been utilized as an example. However, weight or length measuring apparatus can be easily applied to this invention in place of the speedometer. Voice signals representing amounts of weight or length, such as "1 kilogram," "2 kilograms" or "1 millimeter," "2 millimeters," may be recorded on the recording medium, and the belt 10 may be arranged to move in proportion to the amount of weight or length determined by said measuring apparatus.

While the foregoing describes several embodiments of the invention, it is to be understood that various other modifications of the invention can be devised by those of ordinary skill in the art without departing from the scope of the invention as defined by the appended claims.

What is claimed is:

1. An announcing device for use with a measuring apparatus which generates an analog signal, said announcing device comprising:
   a recording medium having thereon a plurality of sound tracks, each of said sound tracks storing a voice signal corresponding to an amount which can be determined by said measuring apparatus;
   a transducer head for scanning said sound tracks;
   a head supporting member for supporting said transducer head;
   a movable carriage connected resiliently to said head supporting member so that said head supporting member is movable as a single unit with said carriage;
   driving means for driving said carriage to move said transducer head, in a direction substantially perpendicular to said sound tracks, in an amount in proportion to the analog amount determined by said measuring apparatus;
   shifting means engageable with said head supporting member for shifting said head supporting member independently from said carriage to move said transducer head, in a direction substantially perpendicular to said sound tracks, at least an amount equal to one pitch between adjacent sound tracks and to position said transducer head at an exact position corresponding to one of the sound tracks; and
   moving means for moving said recording medium at a predetermined speed, whereby upon initiation of said announcing device, said shifting means is engaged with said head supporting member to shift the same so as to position said transducer head at the exact position corresponding to one of said sound tracks, and said transducer head scans said one of said sound tracks with the movement of said recording medium so as to reproduce the voice signal recorded thereon corresponding to the amount measured.

2. An announcing device for a measuring apparatus as claimed in claim 1, wherein said head supporting member is provided with a knife edge, and said shifting means includes an actuating member having an actuating plate with a plurality of saw teeth thereon, the pitch of said saw teeth being equal to the pitch of the sound tracks, one of said saw teeth engaging said knife edge to shift said head supporting member so as to position said transducer head at one of said sound tracks.

3. An announcing device as claimed in claim 1, wherein said head supporting member and said carriage are slidably mounted on a plurality of guide bars, and are connected to each other by a tension spring means attached therebetween for causing said head supporting member to travel along said guide bars as a single unit with said carriage a distance in proportion to the analog amount determined by said measuring apparatus; and wherein upon initiation of said announcing device, said shifting means is engaged with said head supporting member to shift said head supporting member away from said carriage against the biasing force of said tension spring means so as to position said transducer head at the exact position corresponding to one of said sound tracks, and said transducer head scans said one of said sound tracks with the movement of said recording medium so as to reproduce the voice signal recorded thereon corresponding to the amount measured.

4. An announcing device as claimed in claim 1, further comprising means interconnecting said shifting means and said moving means for causing said shifting means to be driven by said moving means when said moving means starts to move said recording medium so that said head supporting member is shifted to position said transducer head at the exact position corresponding to one of the sound tracks.

* * * * *